US008686880B2

(12) United States Patent
Salter et al.

(10) Patent No.: US 8,686,880 B2
(45) Date of Patent: Apr. 1, 2014

(54) COMMUNICATING ELECTRONIC MAP DATA

(71) Applicant: Chersoft Limited, South Yorkshire (GB)

(72) Inventors: Simon Roger Salter, South Yorkshire (GB); Andrew Michael Lloyd Watkin, South Yorkshire (GB)

(73) Assignee: Chersoft Limited (GB)

( * ) Notice: Subject to any disclaimer, the term of this patent is extended or adjusted under 35 U.S.C. 154(b) by 0 days.

(21) Appl. No.: 13/648,553

(22) Filed: Oct. 10, 2012

(65) Prior Publication Data
US 2013/0136156 A1 May 30, 2013

(30) Foreign Application Priority Data

Nov. 24, 2011 (GB) .................................. 1120306.4

(51) Int. Cl.
*H03M 7/00* (2006.01)
*G01C 21/00* (2006.01)

(52) U.S. Cl.
USPC ........................................... 341/50; 701/200

(58) Field of Classification Search
USPC .................. 341/50, 51, 59, 67; 701/200, 423; 382/195, 104; 340/905
See application file for complete search history.

(56) References Cited

U.S. PATENT DOCUMENTS

| 6,768,818 | B2 | 7/2004 | Friederich et al. |
| RE41,983 | E | 12/2010 | Wallner |
| 7,848,878 | B2 * | 12/2010 | Cho et al. ..................... 701/423 |
| 8,264,375 | B2 * | 9/2012 | DeVries ....................... 340/905 |
| 2003/0093221 | A1 | 5/2003 | Adachi |
| 2006/0009906 | A1 * | 1/2006 | Hellmich et al. ............ 701/200 |
| 2006/0269104 | A1 * | 11/2006 | Ciolli ............................ 382/104 |
| 2012/0021762 | A1 * | 1/2012 | Garin et al. ................ 455/456.1 |
| 2013/0044957 | A1 * | 2/2013 | Khorashadi et al. ......... 382/195 |

FOREIGN PATENT DOCUMENTS

KR 1020060105300 A 10/2006

OTHER PUBLICATIONS

Haijun Zhu et al., "Data Compression for Network GIS", Joint Center for Intelligent Spatial Computing, College of Science, George Mason University, pp. 1-6, Fairfax, VA.
Sevenc'S GMBH, "ENC Optimizer Version 2.4 User's Guide", Jul. 2009, pp. 1-188, Hamburg, Germany.
European Intellectual Property Office, "Examination Report for GB1120306.4", Apr. 26, 2013, pp. 1-3, United Kingdom.

(Continued)

*Primary Examiner* — Peguy Jean Pierre
(74) *Attorney, Agent, or Firm* — Schmeiser, Olsen & Watts LLP; Lowell W. Gresham

(57) ABSTRACT

A method of communicating electronic map data is disclosed, wherein map data is compiled as at least one cell comprising a plurality of vector data records and a plurality of feature data records to, for instance, the IHO S-57 standard. During the compilation, the respective bit lengths of a plurality of vector data values are reduced and both the bit-reduced vector data values and feature data values are entropy encoded. The compiled cell data, which may be an Electronic Navigational Chart, is then compressed, encrypted and digitally signed according to, for instance, the IHO S-63 standard. The encrypted and digitally signed cell data is eventually transmitted to a remote navigational system, which may be an Electronic Chart Display and Information System, over a network, for instance in a satellite telecommunication. A system embodying the method is also disclosed.

19 Claims, 10 Drawing Sheets

(56) References Cited

OTHER PUBLICATIONS

Defence Geospatial Information Working Group, "Geography Markup Language (GML) Application Schema for the Multinational Geospatial Co-production Program (MGCP)", Oct. 8, 2008, pp. 1-65, Edition 1.2.1, http://creativecommons.org/licenses/by/2.0/.

International Hydrographic Organization, "IHO Data Protection Scheme", Oct. 2003, pp. 1-86, Edition 1.0, Publication No. 63, Monaco.

Intellectual Property Office, Combined Search and Examination Report under Sections 17 and 18(3), Application No. GB1120306.4, Jul. 20, 2012, pp. 1-7, UK Patent Office, United Kingdom.

* cited by examiner

```
Base cell file ~301
|
|--<1>--Data Set General Information record ~302
|     |
|     |--0001 - ISO/IEC 8211 Record Identifier
|     |     |
|     |     |--<1>-- DSID - Data Set Indentification field
|     |          |
|     |          | --<1>--DSSI - Data Set Structure Information field
|
|--<1>--Data Set Geographic Reference record ~302
|     |
|     |--0001 - ISO/IEC 8211 Record Identifier
|     |     |
|     |     |--<1>--DSPM - Data Set Parameter field
|
|--<R>--Vector record ~303
|     |
|     |--0001 - ISO / IEC 8211 Record Identifier
|     |     |
|     |     |--<1>--VRID - Vector Record Identifier field
|     |          |
|     |          |--<R>--ATTV* - Vector Record Attribute field
|     |          |
|     |          |--<R>--VRPT* - Vector Record Pointer field
|     |          |       |
|     |          |       |    |--<R>--SG2D* - 2-D Coordinate field
|     |          |       |--or-- |
|     |          |              |--<R>--SG3D* - 3-D Coordinate (Sounding array) field
|
|--<R>--Feature record ~304
 (     |
305    |--0001 - ISO/IEC 8211 Record Identifier
            |
            |--<1>--FRID - Feature Record Identifier field
                    |
                    |--<1>--FOID    - Feature Object Identifier field
                    |
                    |--<R>--ATTF*   - Feature Record Attribute field
                    |
                    |--<R>--NATF*   - Feature Record National Attribute field
                    |
                    |--<R>--FFPT*   - Feature Record to Feature Object Pointer field
                    |
                    |--<R>--FSPT*   - Feature Record to Spatial Record Pointer field
```

Fig. 3

```
Update cell file —401
|
|--<1>--Data Set General Information record —302
|   |
|   |--0001 - ISO/IEC 8211 Record Identifier
|   |   |
|   |   |--<1>--DSID - Data Set Identification field
|   |          |
|   |          |--<1>--DSSI - Data Set Structure Information field
|
|--<R>--Vector record —303
|   |
|   |--0001 - ISO/IEC 8211 Record identifier
|   |   |
|   |   |--<1>--VRID - Vector Record Identifier field
|   |          |
|   |          |--<R>--ATTV*  - Vector Record Attribute field
|   |          |
|   |          |--<1>--VRPC   - Vector Record Pointer Control field —403
|   |          |
|   |          |--<R>--VRPT*  - Vector Record Pointer field
|   |          |
|   |          |--<1>--SGCC   - Coordinate Control field —404
|   |          |
|   |          |       |--<R>--G2D* - 2-D Coordinate field
|   |          |---or--|
|   |                  |--<R>--G3D* - 3-D Coordinate (Sounding array) field
|
|--<R>--Feature record —304
    |
    |--0001 - ISO/IEC 8211 Record identifier
    |   |
    |   |--<1>--FRID - Feature Record Identifier field
   (           |
   305         |--<1>--FOID    - Feature Object Identifier field
               |
               |--<R>--ATTF*   - Feature Record Attribute field
               |
               |--<R>--NATF*   - Feature Record National Attribute field      405
               |
               |--<1>--FFPC    - Feature Record to Feature Object Pointer Control field
               |
               |--<R>--FFPT*   - Feature Record to Feature Object Pointer field
               |
               |--<1>--FSPC    - Feature Record to Spatial Record Pointer Control field
               |
               |--<R>--FSPT*   - Feature Record to Spatial Record Pointer field    406
```

Fig. 4

COMMUNICATING ELECTRONIC MAP DATA

FIELD OF THE INVENTION

The present invention relates to the electronic communication of map data. More particularly, the present invention relates to an improved system and method for communicating electronic navigation charts.

BACKGROUND OF THE INVENTION

The advent and widespread adoption of Global Positioning Systems ('GPS') in many different types of transport has increased the need for creating and updating geographical information in electronic form.

Modern map-assisted navigation systems rely on the standard GPS technique of sending, from each of a plurality of satellites in geosynchronous orbit about the Earth, usually at least four, successive timing and orbital information signals to a receiver, from which the geographical position, and possibly also a receiver speed and vector are calculated, through trilateration or other technique. The receiver stores electronic map data, which is processed with the GPS data in real time for overlaying the position, speed and vector information thereon or, as the case may be, for scrolling the electronic map data represented on a display relative to a reference point, for instance the vehicle in which the receiver is carried, according to the speed and vector.

The authoring and communication of electronic map data is, in some particular fields of transport, highly regulated. In the field of maritime transport, for example, electronic map data is commonly referred to as Electronic Navigational Charts ('ENCs') and must conform to several standards promulgated by the International Hydrographic Organisation (IHO) and the International Maritime Organisation (IMO).

For the specific instance of electronic vector ENCs, notable standards in this field include IHO Special Publication S-57, which specifies ENC data types and formats; IHO Special Publication S-52, which specifies ENC data display formats; and IHO Special Publication S-63, which specifies ENC data encryption and digital signing procedures for purposes of communicating ENC data over networks.

ENCs are frequently updated to reflect changes in sea lane characteristics, which arise from any or all of changing geographical features, for instance a depth modified by gradually-moving sand banks; newly-discovered features or hazards, for instance ship wrecks and other seafloor obstacles; new or updated navigational features, for instance new buoys, lanes and anchoring areas; and new costal features, for instance new seaports, lighthouses, airports, coastal roads and the like. The need to communicate electronic map data is therefore constant, as the above non-exhaustive examples illustrate.

The physical communication of electronic map data can however prove difficult, even in an age of pervasive mobile communications on a global scale. In the same field of maritime transport, ENC and their periodical or ad hoc updates are frequently transmitted by satellite link which, relative to mobile telephony networks for instance, provide much narrower bandwidth across which to perform the communication, moreover made available at a significantly higher cost for the ENC user.

In this context, the International Maritime Organisation (IMO) has recently proposed the compulsory carriage of Electronic Chart Display and Information Systems (ECDIS) making use of ENCs for all existing crafts, which is expected to dramatically increase the requirement for bandwidth to communicate corresponding electronic map data. It would therefore be advantageous to provide vector-based electronic map data that is optimized for communication, in such manner that significantly less bandwidth is required to communicate it, irrespective of the communication network used.

SUMMARY OF THE INVENTION

According to a first aspect of the present invention, there is provided a method of communicating electronic map data with a first data processing terminal interfaced with a vehicle-borne map data processing terminal over a network connection, the method being performed at the first data processing terminal and comprising the steps of compiling map data as at least one cell comprising a plurality of vector data records and a plurality of feature data records; compressing the compiled cell data; encrypting and digitally signing the compressed cell data; and transmitting the encrypted and digitally signed cell data over a network; characterised in that the step of compiling comprise the further step of reducing the respective bit length of a plurality of vector data values.

The present invention thus provides an improved method of communicating electronic navigational charts, wherein the data density of geographical values is reduced before the ENC is subjected to compression, whereby the compression is performed upon a reduced and better organized dataset, resulting in a reduction of the compressed data file size by approximately 50%.

The step of compiling may comprise the further step of entropy encoding the bit-reduced vector data values and feature data values.

This further step reduces the data density of both geographical values and map objects or features before the ENC is subjected to compression, whereby the compression is performed upon a further-reduced and still-better organized dataset, resulting in a reduction of the compressed data file size by approximately 75%.

According to another aspect of the present invention, there is also provided a system for communicating electronic map data, comprising a first data processing terminal interfaced with a vehicle-borne map data processing terminal over a network connection, wherein the first terminal comprises electronic map data compiling means adapted to compile map data as at least one cell comprising a plurality of vector data records and a plurality of feature data records; data compressing means adapted to compress, encrypt and digitally sign cell data; and networking means adapted to transmit the encrypted and digitally signed cell data over the network to the vehicle-borne map data processing terminal; characterised in that the electronic map data compiling means is further adapted to reduce the respective bit length of a plurality of vector data values.

In an embodiment, the electronic map data compiling means may be further adapted to entropy encode the bit-reduced vector data values and feature data values.

According to a further aspect of the present invention, there is also provided a set of instructions recorded on a data carrying medium which, when processed by a data processing terminal connected to a network, configures the terminal to compile map data as at least one cell comprising a plurality of vector data records and a plurality of feature data records; compress the compiled cell data; encrypt and digitally sign the compressed cell data; and transmit the encrypted and digitally signed cell data over a network to a vehicle-borne map data processing terminal; characterised in that the set of instructions further configures the terminal to reduce the respective bit length of a plurality of vector data values.

In an embodiment, the set of instructions further configures the terminal to entropy encode the bit-reduced vector data values and feature data values.

In an embodiment, the vehicle-borne map data processing terminal is located in a maritime vessel. In the same, or another, embodiment, the network is a satellite communication network.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 3 shows a typical hierarchical data structure of an electronic map as shown in FIG. 1;

FIG. 4 shows a typical hierarchical data structure of an updated electronic map;

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
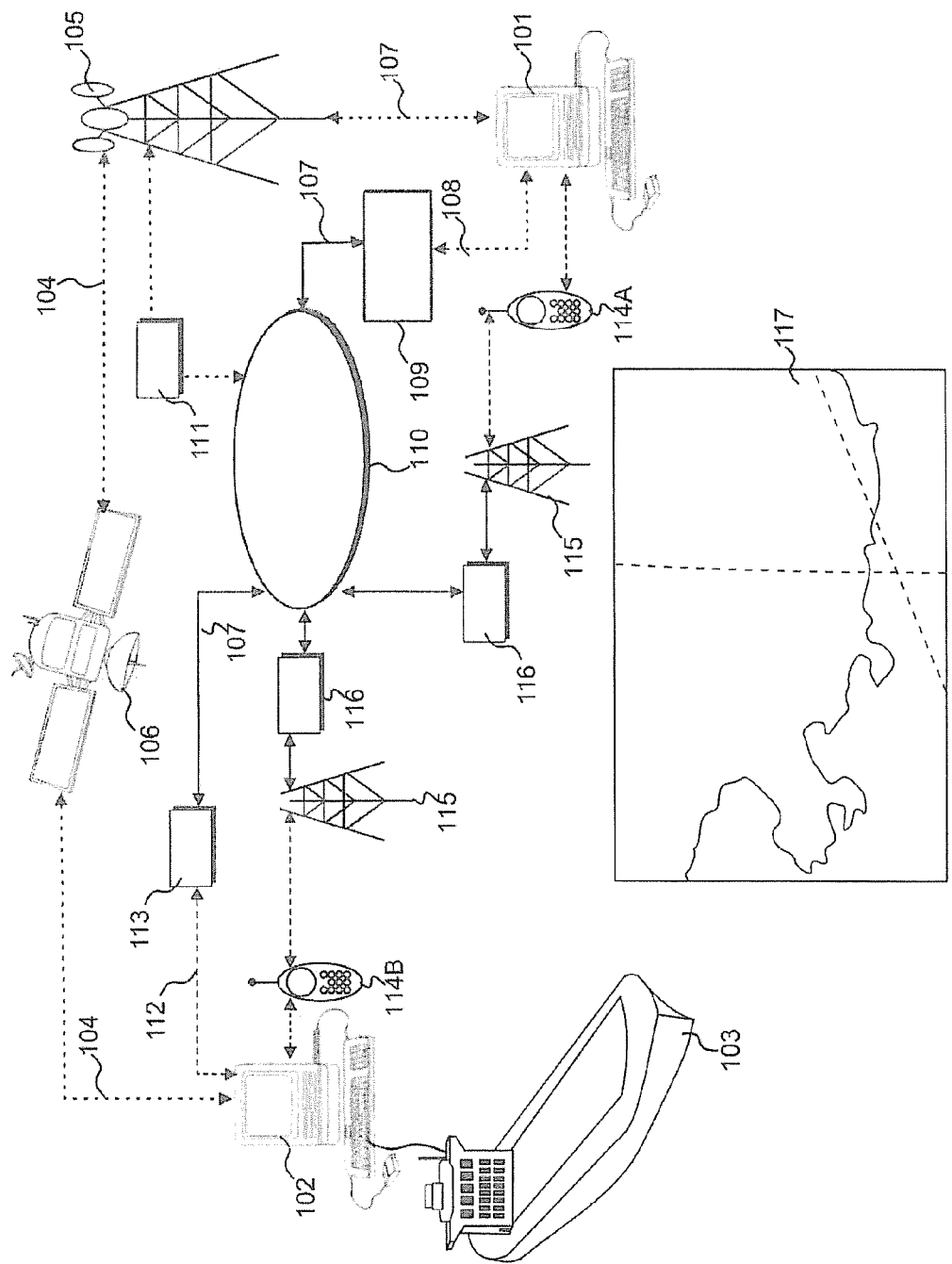
FIG. 1 shows a networked maritime environment including a plurality of terminals communicating electronic map data.

FIG. 1 shows a networked environment including a plurality of data processing terminals, comprising at least one electronic map authoring terminal 101 ashore and at least one electronic map displaying terminal 102 onboard a ship 103. Generally, each terminal 101, 102 may be any data processing device computing having at least data processing means, data storage means and data displaying means. In the example, the at least one shore terminal 101 is a desktop computer connected to at least a first wireless communication network 104, and the at least one ship terminal 102 is an Electronic Chart Display and Information System (ECDIS) periodically connecting to the at least first wireless communication network 104.

The at least first wireless communication network 104 is a Wide Area Network ('WAN'), a first example of which is a satellite communication network. The communication network 104 comprises a satellite ground station 105 which is configured as a communication hub interfacing a satellite 106 with a terrestrial telecommunications network 107. Data or voice communications between the shore and ship terminals 101, 102 are relayed by the satellite 106 and the ground station 105 wherever the ship 103 is located.

The shore terminal 101 may also have wired emitting and receiving functionality over a wired Local Area Network ('LAN') 108 conforming to the IEEE 802.3 ('Gigabit Ethernet') standard, wherein communication is performed as voice, alphanumeric and/or audio-video data using the Internet Protocol (IP), Voice data over IP ('VoIP') protocol, Hypertext Transfer Protocol ('HTTP') or Secure Hypertext Transfer Protocol ('HTTPS'), corresponding digital signals being relayed respectively to or from the shore terminal 101 by a wired router 109 interfacing the terminal 101 to another Wide Area Network ('WAN') via the terrestrial telecommunications network 107, in the example the Internet 110. The Internet 110 may be interfaced with the ground station 105 through one or more relevant gateways and/or remote server terminals 111, to allow the map authoring terminal 101 to communicate electronic map data to the ship terminal 102 in the absence of a direct connection to the ground station 105.

Likewise, the ship terminal 102 may also have wireless emitting and receiving functionality over a Wireless Local Area Network ('WLAN') 112 conforming to the IEEE 802.11 ('Wi-Fi') standard, wherein communication is performed as voice, alphanumeric and/or audio-video data using the same IP, VoIP, HTTP or HTTPS protocols, corresponding digital signals being relayed respectively to or from the ship terminal 102 by a shore-based wireless router 113 interfacing the ship terminal 102 to the Internet 110 or directly to the shore terminal 101 via the terrestrial telecommunications network 107, whenever the ship is in range of that router 113, typically when berthed in a harbour.

The shore terminal 101 and the ship terminal 102 may usefully be further interfaced with a cellular telephone network configured according to any or all of the Global System for Mobile Communication ('GSM'), General Packet Radio Service ('GPRS'), International Mobile Telecommunications-2000 (IMT-2000, 'W-CDMA' or '3G') network industry standards, wherein the terminals 101, 102 receive or emit voice, text, audio and/or image data encoded as a digital signal over a wireless data transmission, either through self-contained mobile telephony hardware means or when operably connected to a nearby cellular telephone handset 114.

The digital signal is relayed respectively to or from the terminals 101, 102 or their respectively-associated handset 114A, 114B by the geographically-closest communication link relay 115 of a plurality thereof, which allows digital signals to be routed between the terminals or handsets and their destination by means of a remote gateway 116. The gateway 116 is for instance a communication network switch, which couples digital signal traffic between wireless telecommunication networks, such as the network within which wireless data transmissions take place and the WAN 110. The gateway 116 further provides protocol conversion if required, for instance if a terminal 101, 102 or handset 114A, 114B uses the WAP or HTTPS protocol to communicate data. The cellular telephone network provides a useful alternative to the WLAN 112 for interfacing the ship terminal 102 to the Internet 110 or directly to the shore terminal 101, whenever the ship is in range of a communication link relay 115, which range exceeds significantly that of a wireless router 113.

The shore terminal 101 can therefore communicate electronic map data 117 to the ECDIS 102 across a variety of electronic communication networks, however routinely across the satellite network 104, 105, 106, when the ship 103 is at sea.

Figure 2:
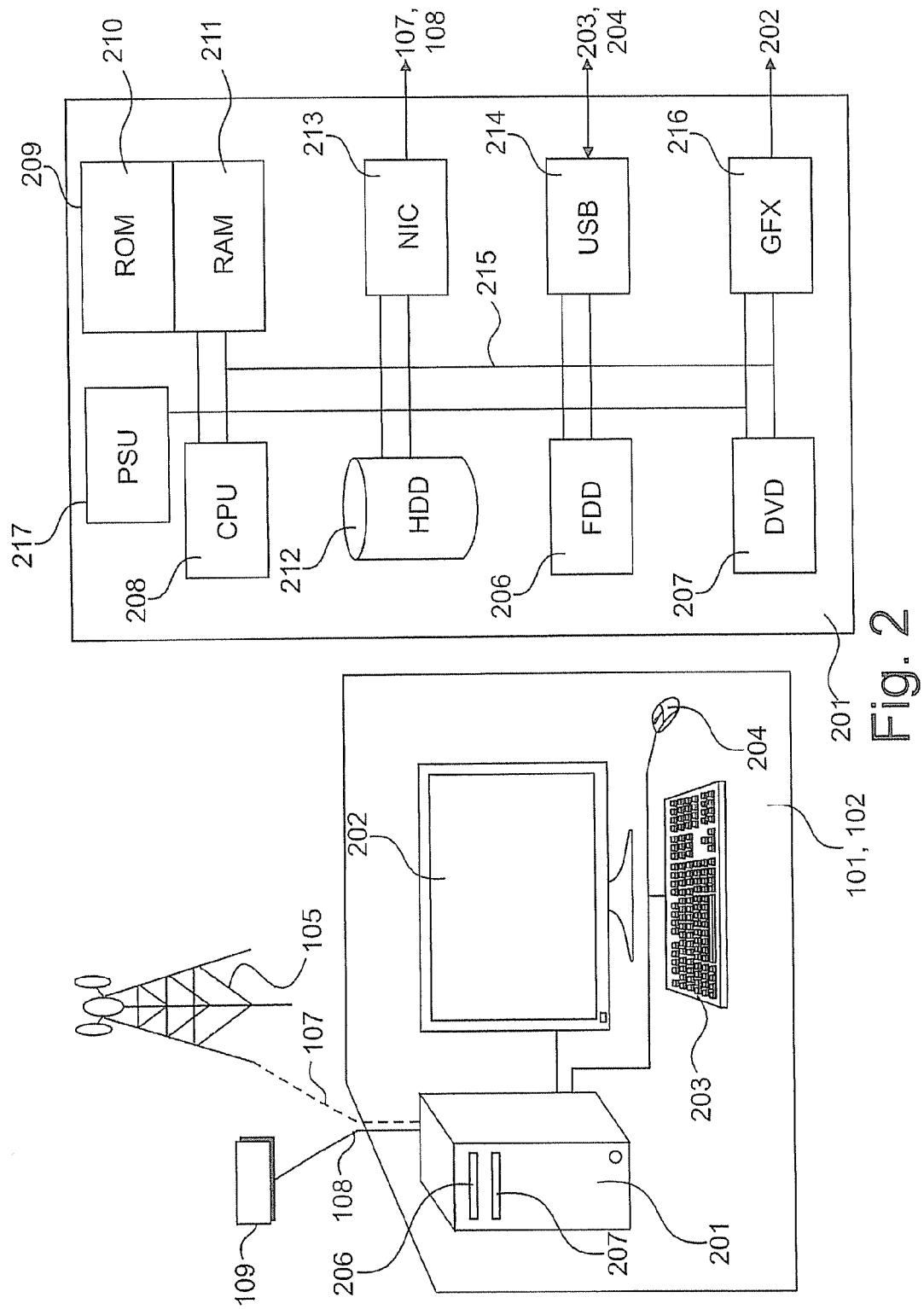
FIG. 2 illustrates a typical hardware structure of each terminal shown in FIG. 1.

A typical hardware architecture of the shore or ship terminal 101, 102 is shown in FIG. 2 in further detail, by way of non-limitative example. The terminal 101, 102 is a data processing device configured with a data processing unit 201, data outputting means such as video display unit (VDU) 202, data inputting means such as HiD devices, commonly a keyboard 203 and a pointing device (mouse) 204, as well as the VDU 202 itself if it is a touch screen display, and data inputting/outputting means such as the wired or wireless network connection(s) 107, 108, 112 to the communication network (s) 107, 109, 113, a magnetic data-carrying medium reader/writer 206 and an optical data-carrying medium reader/writer 207.

Within data processing unit 201, a central processing unit (CPU) 208 provides task co-ordination and data processing functionality. The CPU 208 is preferably a multi-core processor having several cores, each apt to process a respective data processing thread simultaneously with the others. Examples of multi-core processors include the Intel i3, i5 and i7 processors manufactured by the Intel Corporation of Santa Clara, Calif., USA and the AMD Phenom X2, X4 and X6 manufactured by the Advanced Micro Devices Corporation of Sunnyvale, Calif., USA.

Instructions and data for the CPU 208 are stored in memory means 209. Memory means 209 comprises non-volatile random-access memory ('NVRAM') or Read-Only Memory ('ROM') 210, in which a first set of instructions for the CPU 208, known as the Basic Input/Output System ('BIOS') is permanently stored for initialising the terminal hardware whenever it is started up. Memory means 209 further comprises Random-Access Memory ('RAM') 211, in which a second set of instructions for the CPU 208, known as the Operating System ('OS'), is loaded from a Hard Disk Drive ('HDD') unit 212 for using the terminal whenever it is started up. The OS is for instance Windows 7 Professional, distributed by the Microsoft Corporation of Redmond, Wash., USA.

The HDD 212 facilitates non-volatile storage of the instructions and the data in data files. A wired and/or wireless network interface card (NIC) 213 provides the interface to the network connection(s) 107, 109, 113. A universal serial bus (USB) input/output interface 214 facilitates connection to the keyboard and pointing devices 203, 204, as well as a multitude of further USB-configured devices, for instance a GPS device (not shown) and a satellite communication modem (not shown) for ship terminal 102.

All of the above components are connected to a data input/output bus 215, to which the magnetic data-carrying medium reader/writer 206 and optical data-carrying medium reader/writer 207 are also connected. A video adapter 216 receives CPU instructions over the bus 215 for outputting processed data to VDU 202. All the components of data processing unit 201 are powered by a power supply unit 217, which receives electrical power from a local mains power source and transforms same according to component ratings and requirements.

The hardware architecture of the shore or ship terminal 101, 102 described hereinbefore corresponds generally to a personal computer, however it will be readily understood by the skilled person from the foregoing that the inventive concept will be easily adapted to any networkable data processing terminal having an alternative hardware architecture providing at least comparable data processing and communication functionalities. The shore terminal 101 can therefore store, process and communicate electronic map data 117, and the ECDIS 102 can therefore receive, store and process electronic map data 117.

The electronic map data 117 is an Electronic Navigation Chart (ENC) used by the crew of the ship 103 with the ECDIS 102 for travel planning and monitoring purposes. The ENC 117 is a particular implementation of the data structure defined in IHO Special Publication S-57, and is used herein by way of non-limitative example, as it will be readily understood by the skilled person that the inventive concept disclosed herein is equally applicable to any other S-57 data structure.

In order to facilitate the efficient processing of ENC data, geographic coverage is split into cells 117. Each cell 117 is contained in a physically separate, uniquely identified file on the transfer medium, known as a data set file. The geographic extent of the cell 117 is currently determined by the ENC producer, who operates the map authoring terminal 101, to ensure that the resulting data set file contains no more than 5 megabytes (MB) of data. Subject to this consideration, the cell size must not be too small either, in order to avoid the creation of an excessive number of cells. Typically, cells are substantially rectangular, being defined by 2 meridians and 2 parallels.

Various types of cells 117 may exist in respect of a same geographical area represented by same: a base cell, or base data set, is a comprehensive record of the geographical area; an update cell, or update data set, is a record of the same geographical area containing only changes applicable in respect of the last-issued base, revision or prior update cell; and a revision or 're-issue' cell is a comprehensive record of the geographical area including all intervening changes since the last current base cell was issued, thus consolidating all intervening updates. IMO standards dictate the frequency at which any ECDIS 102 should update its cell(s) records, and IHO standards specify, and national IHO offices administer, databases of base, update and revision cells to ensure data consistency and accuracy.

With reference to FIG. 3, each base cell 117 is an electronic data file 301 conforming to the self-descriptive mechanism prescribed by the ISO/IEC 8211 file format, and comprising data records as metadata 302, geographical data 303 and feature data 304, hierarchically structured using chain-node topology 305. With reference to FIG. 4, each update cell 117 is likewise an electronic data file 401, which is substantially identical to a base cell file 301, however which further comprises respective update control fields 402, 403 about changed geographical data 303 and/or update control fields 404, 405 about changed feature data 304.

The data records correspond to an object catalogue defined by the S-57 data schema. The primary function of the object catalogue is to provide a means of describing real world entities, which exist either physically, such as a e.g. beacon, or legally, such as an anchorage area, whereby real world entities can be categorised into a finite number of types. These entity types are termed feature object classes in the object catalogue. Each instance of a feature object class, referred to as a feature object (e.g. one specific light, or wreck, or built-up area) is more precisely described by assigning to it a number of attributes, and then specifying values for those attributes. A particular real world entity is encoded by specifying the appropriate feature object class, attributes and attribute values. For example, a red lateral buoy would be encoded as follows: feature object class: buoy lateral; attribute: colour; attribute value: red.

The S-57 data schema defines four types of feature objects: Geo objects, containing the descriptive characteristics of a real world entity; Meta objects, containing information about other objects (e.g. compilation scale, vertical datum); Collection objects, containing information about the relationships between other objects; and Cartographic objects, containing information about the cartographic representation of a real world entity. Each object class is specified in a standardised way, under three main headings: Object Class, which is the object class name; Acronym, which is a six-character code for the object class; and Code, which is an integer code to be used in the coding of data.

A set of relevant attributes is defined for each object class, and divided into three subsets: subset Attribute_A, in which attributes define the individual characteristics of an object; subset Attribute_B, in which attributes provide information relevant to the use of the data, e.g. for presentation or for an information system; and subset Attribute_C, in which attributes provide administrative information about the object and the data describing it.

In the above context, the geographical data 303 comprises vector data values, and the feature data 304 comprises feature data values. Vector characteristics, such as latitude and longitude values, are converted from decimal degrees to integers, and the integer values are encoded according to the electronic map resolution. If the user of the ENC authoring terminal 101 chooses a resolution of 0.0001 ($10^{-4}$), then the value of a longitude co-ordinate scaling factor is 10.000 ($10^4$). A longitude value of 34,5678 is thus converted by multiplication with the co-ordinate multiplication factor into an integer value of 34,5678×10.000=345678. The integer value of the converted co-ordinate is encoded in binary form.

Figure 5:
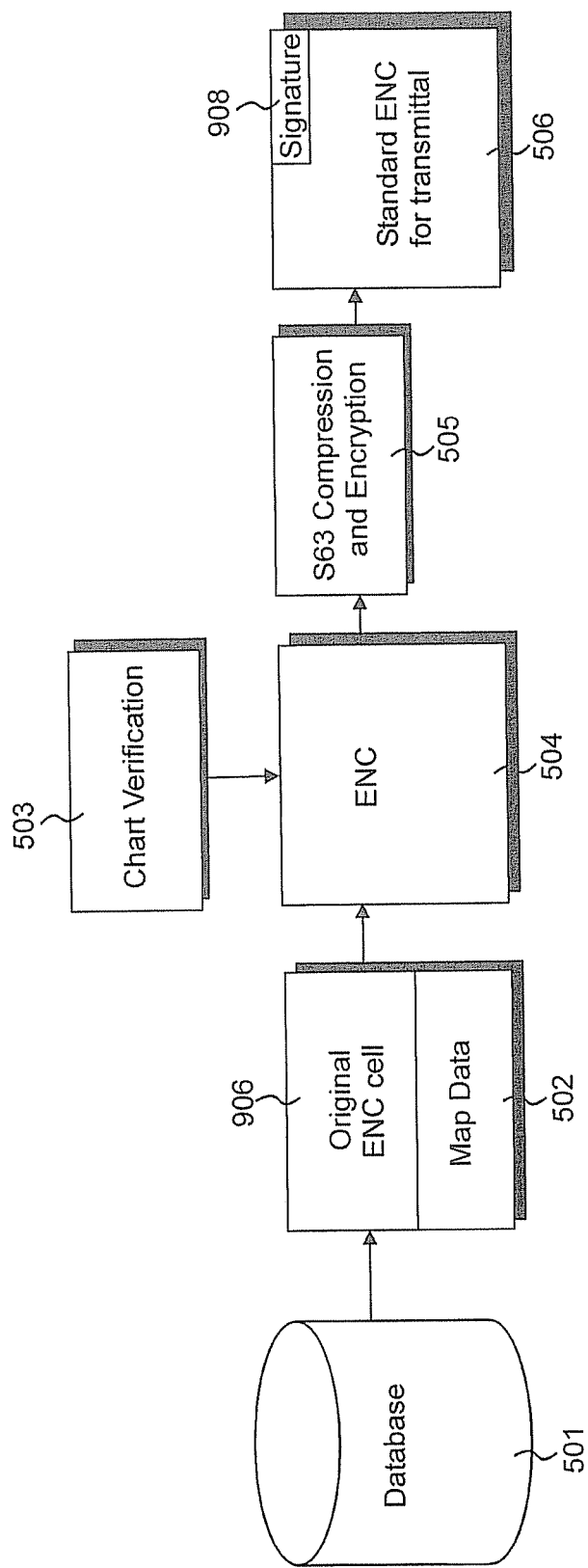
FIG. 5 details data processing steps for authoring and communicating electronic map data according to the prior art.
Figure 9:
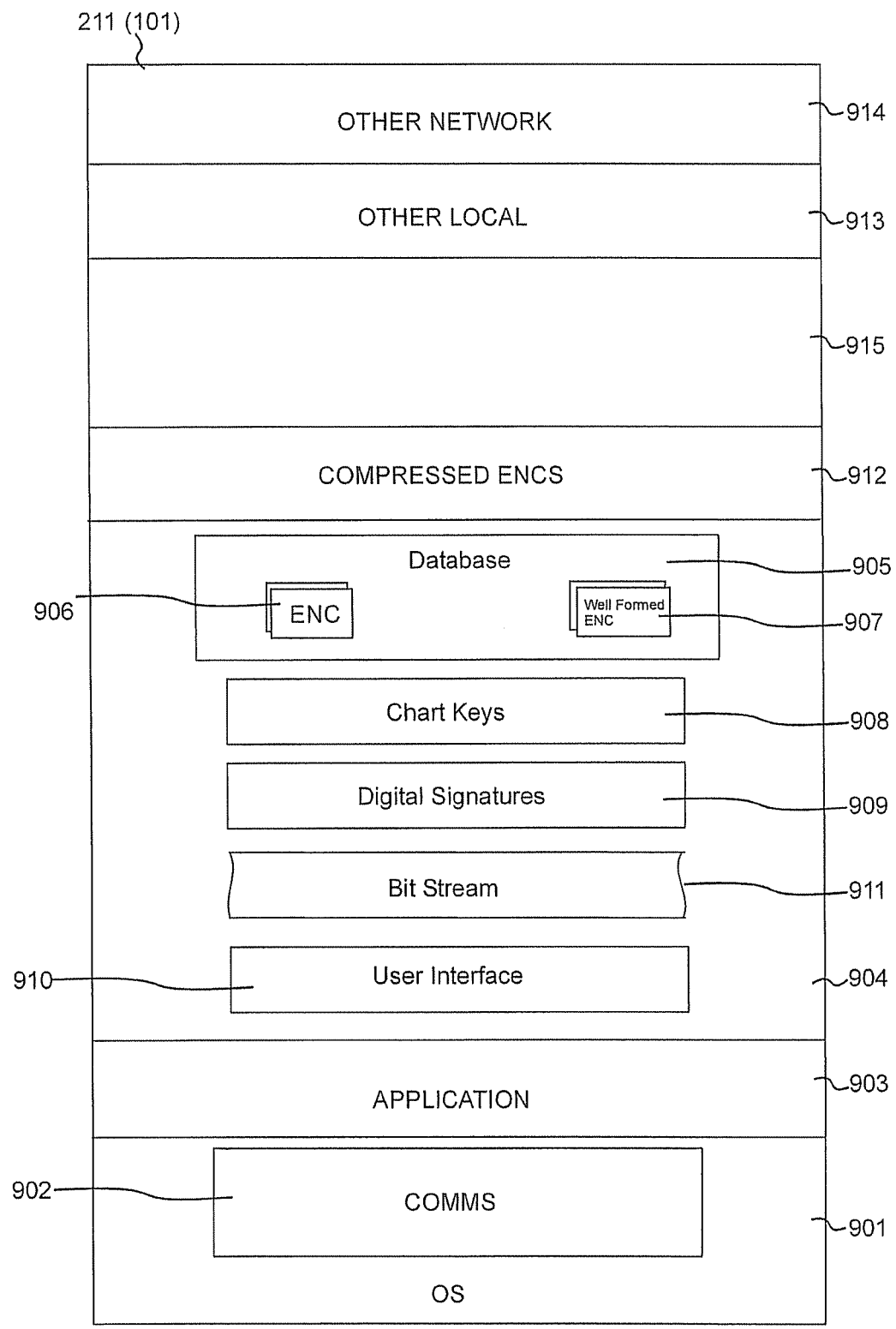
FIG. 9 illustrates the memory contents of a terminal of FIGS. 1 and 2 when performing the method of FIG. 7, 8 or 9, including a set of instructions and a database.

With reference to FIG. 9, for common data structure nomenclature, and to FIG. 5, which details the data processing steps for authoring or updating a typical ENC for transmittal according to the prior art, cells 301, 401 are authored and communicated to remote ECDIS 102 and comparable navigation systems according to a standard communication protocol defined by IHO Special Publication S-63, which specifies ENC data encryption and digital signing procedures. A database 501 stores either unformatted electronic map data 502 or cells 906. The electronic map data 502 is formatted into a S-57 cell 906 at 503, or the cell 906 is updated according to one or more IHO Official Notice(s) at that stage. The output cell of the electronic map data editing of step 503 is verified by a chart compiler 504 for data accuracy and consistency in order to output a fully S-57 compliant cell 906. The S-63 transmittal scheme requires that the data is encrypted and digitally signed at 505, to ensure compatibility with existing ECDIS 102 equipment. The output 506 of the compression and digital signing step 505 is a data file comprising a digital signature 908 ready to be transmitted over the network 104.

The standard S-63 transmittal of S-57 cells uses Zip™ compression at step 505. This is a fast and efficient general purpose technique, which is difficult to improve upon, whereby the only practical approach to significantly improve performance is to use specialist knowledge of the particular data involved.

The inventors have realised that, for any given cell, the attribution for any particular attribute can only be drawn from a limited sub-set of all possible attributes; real world attribute values are usually only a sub-set of all possible values; and within the context of the S-57 standard, only a small number of permutations of the total descriptive space provided by ISO/IEC8211 are used. Taking these variables into account when authoring electronic map data can improve the compression of step 505 to reduce the output ENC file size by up to 50%. Advantageously, techniques implementing these variables are binary reversible, such that the regenerated ENC file can be identical to the file input to the compression process.

The inventors have also realised that, for any given cell, most of the cell data represents real world geographic objects and is intended for display at a limited scale range. In a typical prior art cell, latitude and longitude values each use 32 bits per value, and represent about 62% of the data volume, however latitude and longitude values only require 16 to 18 bits to be represented exactly, because most positions are geographically near the previous position in the hierarchical structure 305. The inventors have also realised that latitude and longitude values only require 8 to 10 bits to be represented indistinguishably when the cell is displayed on the ECDIS 102, because small differences (substantially inferior to 0.1 pixel at compilation scale) will not be noticed when the cell is displayed at any reasonable scale. By way of example, one 10 millionth of a degree is only 1 centimeter whereas, at a scale of 1:50.000, one screen pixel is 10 meters, equivalent to a ratio of 1000. In such a case, the end 7 bits could simply be discarded while retaining an accuracy of 1 pixel at 10 times more detailed than compilation scale.

Taking this further variable into account when authoring electronic map data can improve the compression of step 505 to reduce the output ENC file size further, by up to 50% again. The data representing geographical objects is replaced by equivalent data, which when processed by the ECDIS 102 will provide the same visual depiction and meta data, but may differ from the original in several significant ways: the co-ordinates are spaced so that they are adequate to represent the object but no closer; and the co-ordinates are spaced in a regular way.

The latitude and longitude values, typically in 10 millionths of a degree, is modified so that the appearance of the displayed cell is indistinguishable from the original at a scale of up to 10 times more detailed than the compilation scale of the cell; and the latitude and longitude values are chosen so that they will compress optimally, for example using common differences. The data point density is also minimised. Carefully choosing bit values below the resolution limit allows the compression stage to work optimally, eliminating 1 or 2 more bits per value. Thus, additional compression steps can be applied to the regular, more predictable co-ordinates. However, this data reducing technique is not reversible, whereby it needs to be performed before the digital signature 909 is created at step 505.

With reference to FIG. 9, for common data structure nomenclature, and to FIG. 6, which details data processing steps for authoring an ENC 907 for transmittal according a first embodiment of the invention, the ENC 907 will hereinafter be referred to, depending on the data processing stage, as a 'well-formed' cell and an 'optimally-compressed' cell. A database 905 stores either unformatted electronic map data 502, prior art cells 906 or 'well-formed' cell 907. Either the electronic map data 502 or the prior art cell 906 is formatted into a well-formed cell 907 at step 601. The map or cell data 502, 906 is edited into a form which appears identical to the original on a standard graphical S-57 cell viewer such as the ECDIS 102; does not contain any surplus or duplicate data; does not contain data which cannot not usefully contribute to the appearance when the cell is displayed; changes many of the original elements so that they are more regular or predictable; and reduces the entropy of the cell to be close to the minimum possible that will accurately represent the required information in the S-57 format. The output well-formed cell 907 of the electronic map data editing of step 601 is verified by a chart compiler 504 for data accuracy and consistency in order to output a fully S-57 compliant well-formed cell 907.

The well-formed cell 907 cell is next compressed and encrypted using the chart key 908 at step 505, then digitally signed with a digital signature 909 at step 506. These steps are per S-63 and uses conventional techniques as described with reference to FIG. 5. The resultant cell 907 output by step 506 is binary identical to the cell that will be created at the end of the transmission process, in a standard S-57 format, however it is no longer needed. However, the chart key 908 and digital signature 909 are buffered for use in a second data reduction stage 602, wherein all of the regular and predictable parts of the S-57 format are replaced, using standard indexing techniques such as Huffman coding. While this is step may be performed upon any S-57 cell, it is optimal when applied to a well-formed cell 907, and the resultant "low entropy" cell 603 contains considerably less information that the well-formed cell 907. The "low entropy" cell 603 is then compressed, for instance using the Zip™ algorithm, and encrypted with the chart key 908 and signature 909 at step 604, resulting in an optimally-compressed cell 605 which, when decoded, will be binary identical to the well-formed cell 907. This file is now ready for communication to the remote ECDIS 102 and will be as little as 25% of the size of the equivalent, standard S-57 format ENC file.

Throughout the processing of steps 601 and 602, data patterns are identified in the data bit stream 910. If any unrecognised patterns are identified, the application 903 processes the corresponding data verbatim. This pass-through approach ensures that unexpected data is processed correctly and never gets corrupted, however it may not be optimally compressed.

Figure 7:
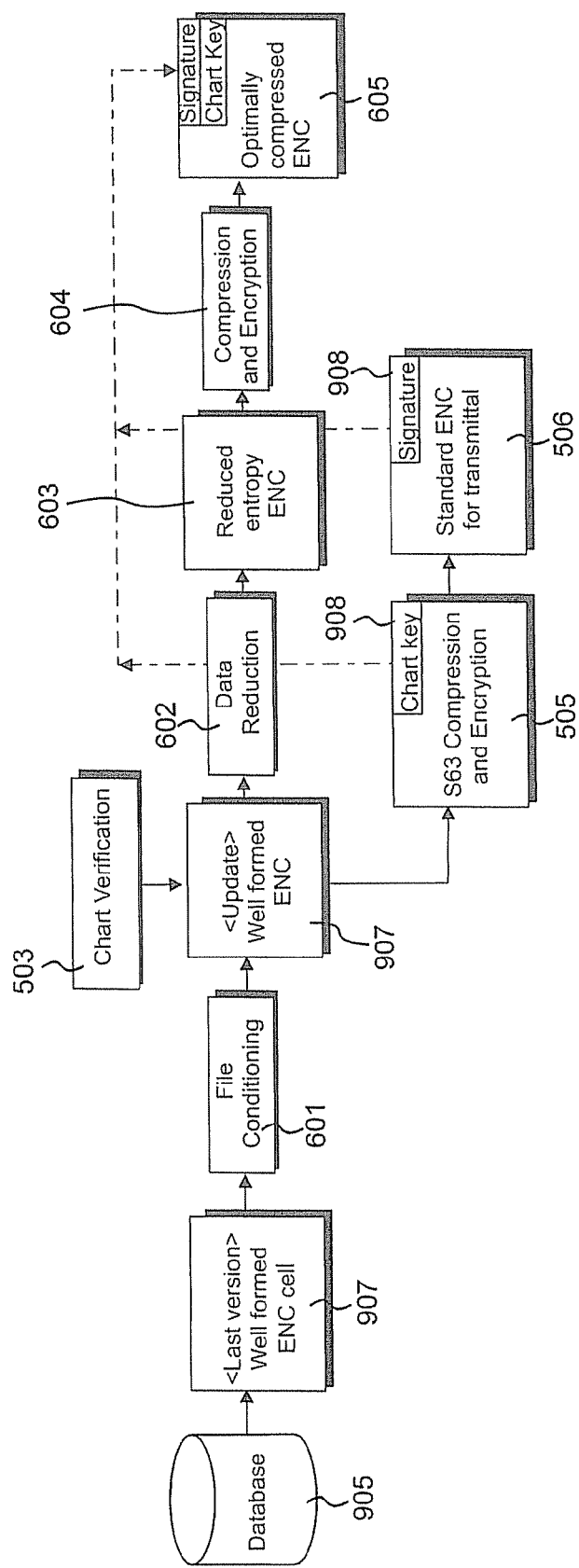
FIG. 7 details data processing steps for updating authored electronic map data according to another embodiment of the invention.

With reference to FIG. 7, when the cell next need updating according to one or more IHO Official Notice(s), then substantially the same data processing steps are performed, however these must be based upon a differentiation of well-formed cells 907, rather than original format cells 906, since this would otherwise result in malformed update cell files. Accordingly, further to the electronic map data editing step of 601 performed upon the last issued base ENC cell 907, the updated ENC cell is likewise a well-formed cell 907, requiring still less data processing relative to prior art updating methods.

Figure 8:
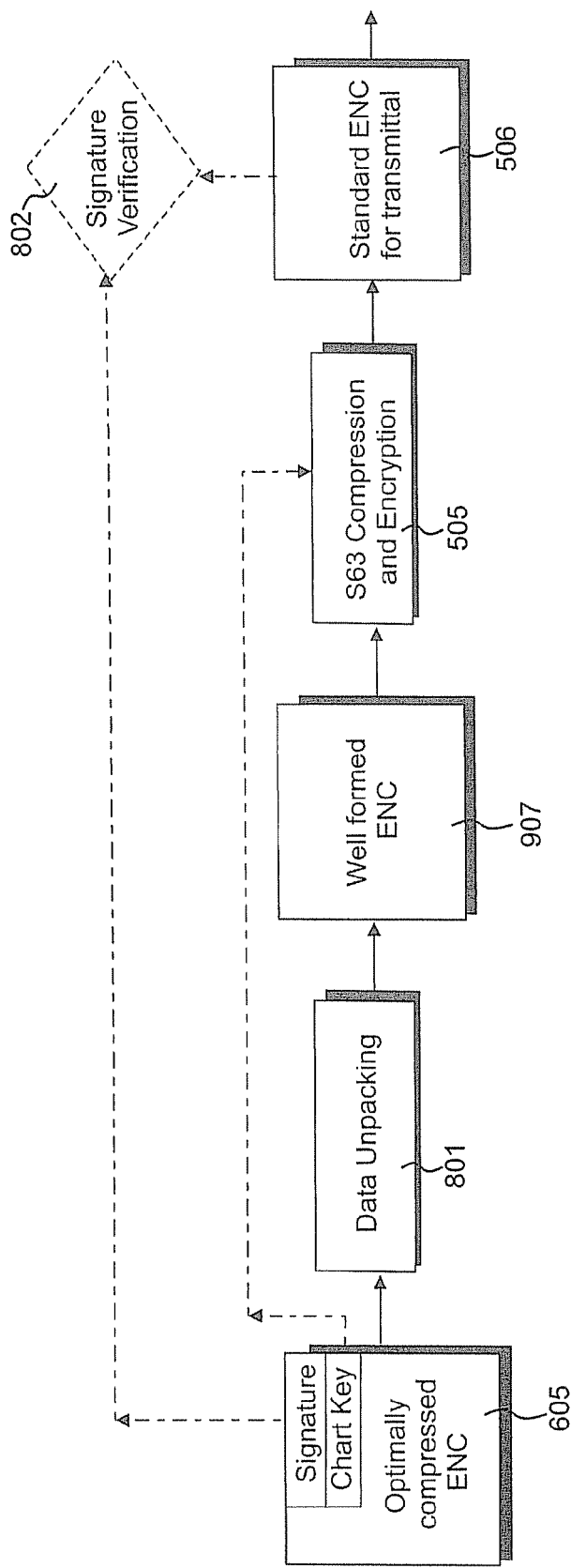
FIG. 8 details data processing steps for communicating the electronic map of FIG. 6 or the update of FIG. 7 between the two terminals shown in FIGS. 1 and 2.

With reference to FIG. 8, in the decompression processing at the ECDIS 102, the transmitted file 605 is first unpacked at step 801, during which the data reduction algorithms of steps 601, 602 are reversed, in order to create a memory image of the well-formed cell 907. The image of the well-formed cell is then compressed using zip and encrypted using the chart key 908 initially extracted from the transmitted file, at step 802. The resultant S57 file 506 and signature 909 are now binary identical to those created during the data preparation phase.

This data processing method thus provides improved compression, resulting from bit stream encoding rather than byte stream encoding; the use of many specific encodings, since the distribution of values for a particular attribute is often a strong function of some other attribute; elimination of the ISO/IEC 8211 data overhead; and the use of common compound values, since common combinations of values require only a short encoding. Variations of the data processing method may include further optimisation techniques such as, by way of non-limitative example: cherry picking, as areas of greatest distributing variability compress best; scoping, as fewer values need to be distinguished in a limited domain; tagging, since a repeated value or group of values can be identified by a shorter tag which can be looked up in a transmitted dictionary; dictionary substitution, since a repeated value or group of values can be identified by a shorter tag which can be looked up in a known (not transmitted) dictionary; and ordering, as a value can be implied by its position in the data stream.

Alternative embodiments of the data processing method may omit the initial creation of the well-formed file 907 at step 601, whereby such embodiment are expected to improve the compression by a factor of approximately 50% relative to prior art techniques. Alternative embodiments of the data processing method may also omit encrypting techniques, if they are not required, whereby the chart key 908 and digital signature 909 do not need to be transmitted. A well-formed cell 907 created from data unpacking at 801 can be used directly, and the standard S-63 file 605 does not need to be created. The exact encryption techniques for the optimally compressed cell 605 is unimportant, so long as it provides adequate security, use a known vector and is reversible. The encryption associated with Zip™ is deemed appropriate.

FIG. 9 is a logical diagram of the contents of the memory means 311 of the data processing terminal 101, when performing 601 to 80× at runtime. An operating system is shown at 901 which, if the terminal 101 is a desktop computer, is for instance Windows 7™ distributed by the Microsoft Corporation. The OS 601 includes communication subroutines 902 to configure the terminal for bilateral network communication via the NIC 213.

An application is shown at 903, which configures the terminal 101 to perform at least processing steps 502 to 802 as described hereinbefore, and which is interfaced with the OS 901 and network communication subroutines 902 thereof via one or more suitable Application Programmer Interfaces.

Application data is shown at 904, which comprises local and network data. Local application data comprises a database 905 of conventional ENCs 117 and authored well-formed ENCs 906. Local data also comprises any reduced-entropy ENC 907 buffered whilst steps 601 and 602 are performed. Local data further comprises ENC chart key 908 buffered between steps 505 and 604 and any ENC digital signature 909 buffered between steps 506 and 604. Local data further comprises bit stream data 910 being processed according to any of steps 504, 505, 506, 601, 602 and 604. Local data further comprises a user interface 911 output to the VDU 202 in order to facilitate user interaction and application data local input. Network application data comprises compressed and encrypted ENCs 912 being communicated to one or more remote ECDIS 102 across one or more of the networks described with reference to FIG. 1.

Further local and network data may be stored in the memory means 211 of the data processing terminal 101 at runtime, some or all of which may be processed by the application 903. An example of further local data is local user input 913 received from data input means 203, 204 in respect of data value editing and/or navigation in the user interface. An example of further network data is remote ENC updating data 914 such as electronic Notices to Mariners communicated by one or more national IHO offices over the WAN 110.

The memory means 311 may further comprise local and/or network data 915 hat is unrelated to application 903, for instance used by or generated for another application being processed in parallel with application 903.

Figure 6:
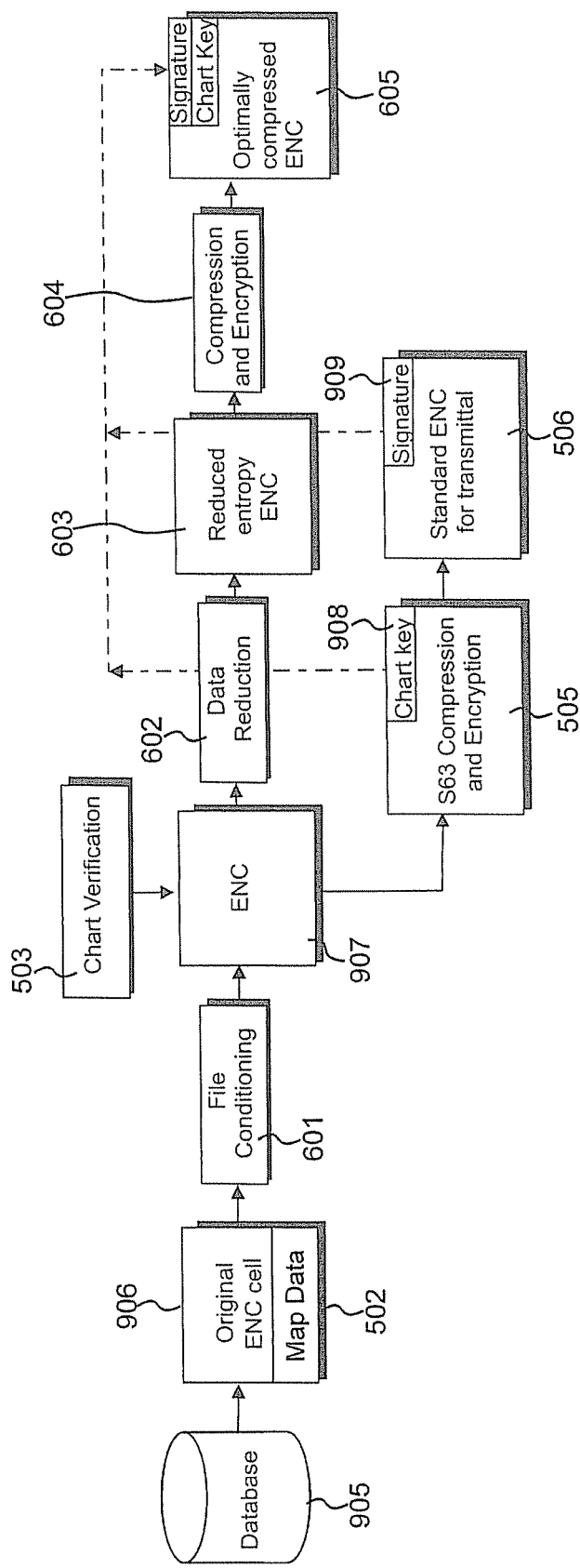
FIG. 6 details data processing steps for authoring electronic map data according to a first embodiment of the invention.
Figure 10:
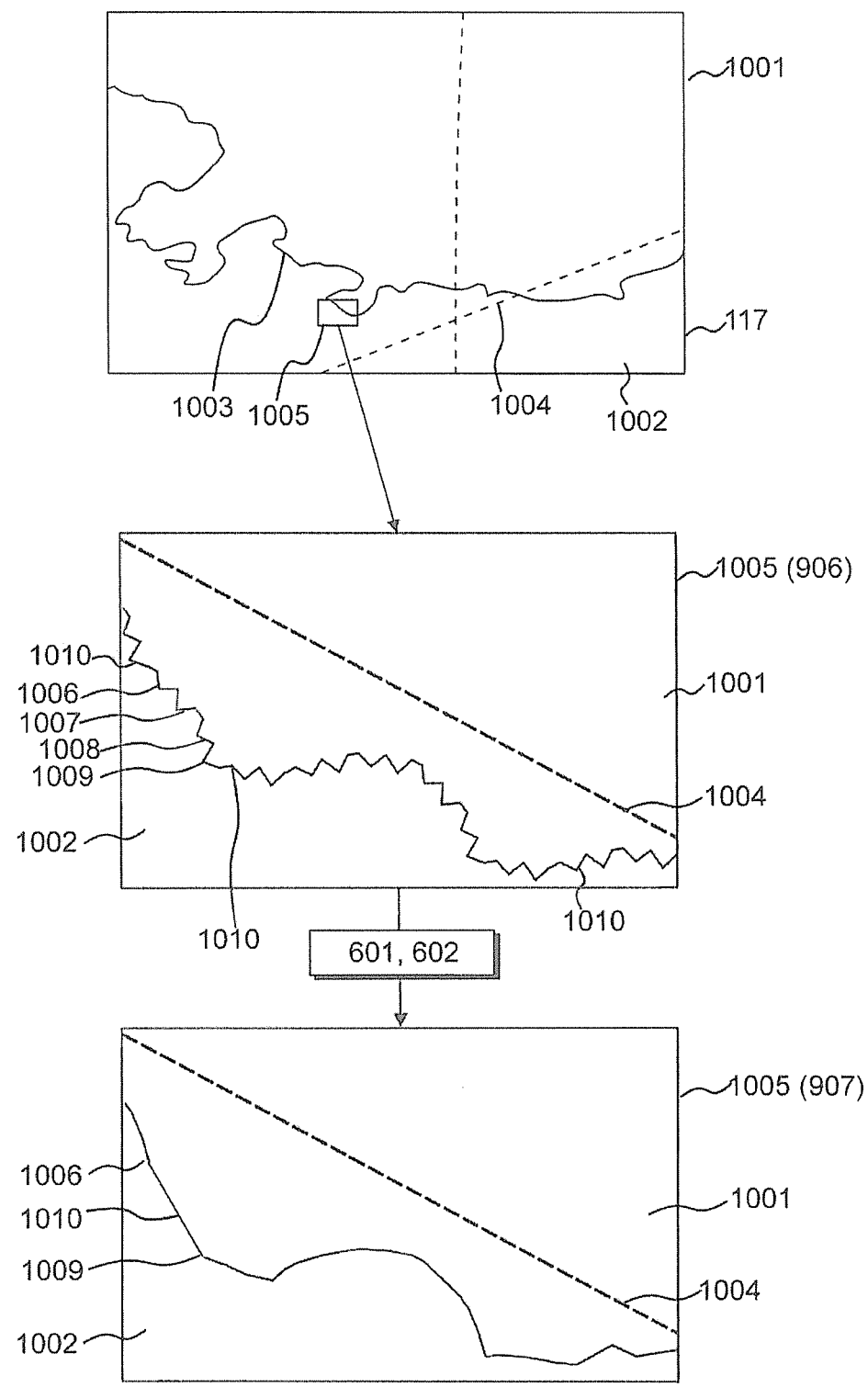
FIG. 10 provides a graphical illustration of the electronic map data of FIGS. 1, 3 and 4 communicated according to the method of FIG. 8.

With reference to FIG. 10, a graphical illustration of the inventive concept explained in Figures electronic map data 117 of FIGS. 1, 5 and 6 edited according to the editing steps 601, 602 is shown as a succession of electronic maps at varying scales. An electronic map 117 comprises one or more land areas 1001 bordered by a sea area 1002, whereby a coastline 1003 is defined, all being overlayed by latitude and/or longitude reference lines 1004.

A section 1005 of the coastline 1003 is next scaled up, for instance during navigational tasks, the first representation showing the corresponding detail of a prior art cell 906, in which any portion of the coastline 1003 is densely defined by a plurality of adjacent points 1006, 1007, 1008, 1009 separated by respective vectors 1010.

The same section 1005 of the coastline 1003 is scaled up in the second representation, showing the corresponding detail of a cell 907 according to the invention, in which, pursuant to the data reduction performed at steps 601, 602, any portion of the coastline 1003 is less densely defined by only some of the adjacent points 1006, 1009 separated by respective vectors 1010. At a same scale, the second representations provides substantially the same information for the navigational tasks or purposes as the first representation, however requires significantly less data to define that information.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments hereinbefore described but may be varied in both construction and detail. For example, it will be readily understood by skilled persons that the inventive principle disclosed herein may be permanently integrated into the base configuration of an item through relevant manufacturing techniques, for instance injection moulding, rather than manufacturing the attachment device separately from the item to be secured thereto.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention claimed is:

1. A method of communicating electronic map data to a remote vehicle, comprising a first data processing terminal interfaced with a vehicle-borne map data processing terminal over a network connection, the method performed at the first data processing terminal comprising the steps of;
    compiling map data as at least one cell comprising a plurality of vector data records and a plurality of feature data records;
    compressing the compiled cell data;
    encrypting and digitally signing the compressed cell data; and
    transmitting the encrypted and digitally signed cell data over the network;
    characterised in that the step of compiling comprises the further step of reducing the respective bit length of a plurality of vector data values.

2. A method according to claim 1, comprising the further step of entropy encoding the bit-reduced vector data values and feature data values.

3. A method according to claim 1, wherein the at least one cell is a data structure hierarchically structured using chain-node topology.

4. A method according to claim 3, wherein the data structure is according to IHO Special Publication S-57.

5. A method according to claim 4, wherein the data structure is a base cell comprising data records as metadata, geographical data including the vector data records and feature data including the feature data records.

6. A method according to claim 4, wherein the data structure is an update cell comprising data records as metadata, geographical data including the vector data records, feature data including the feature data records, and update control fields.

7. A method according to claim 1, wherein the vehicle-borne map data processing terminal is located in a maritime vessel.

8. A method according to claim 1, wherein the network is a satellite communication network.

9. A system for communicating electronic map data to a remote vehicle, comprising a first data processing terminal interfaced with a vehicle-borne map data processing terminal over a network connection, wherein the first data processing terminal comprises
    electronic map data compiling means adapted to compile map data as at least one cell comprising a plurality of vector data records and a plurality of feature data records;
    data compressing means adapted to compress, encrypt and digitally sign cell data; and
    networking means adapted to transmit the encrypted and digitally signed cell data over the network to the vehicle-borne map data processing terminal;
    characterised in that the electronic map data compiling means is further adapted to reduce the respective bit length of a plurality of vector data values.

10. A system according to claim 9, wherein the electronic map data compiling means is further adapted to entropy encode the bit-reduced vector data values and feature data values.

11. A system according to claim 9, wherein the at least one cell is a data structure hierarchically structured using chain-node topology.

12. A system according to claim 11, wherein the data structure is according to IHO Special Publication S-57.

13. A system according to claim 12, wherein the data structure is a base cell comprising data records as metadata, geographical data including the vector data records and feature data including the feature data records.

14. A system according to claim 12, wherein the data structure is an update cell comprising data records as metadata, geographical data including the vector data records, feature data including the feature data records, and update control fields.

15. A system according to claim 9, wherein the vehicle-borne map data processing terminal is located in a maritime vessel.

16. A system according to claim 9, wherein the vehicle-borne map data is an Electronic Chart Display and Information System (ECDIS).

17. A system according to claim 9, wherein the network is a satellite communication network.

18. A set of instructions recorded on a data carrying medium which, when processed by a data processing terminal connected to a network, configures the terminal to;
- compile map data as at least one cell comprising a plurality of vector data records and a plurality of feature data records; compress the compiled cell data;
- encrypt and digitally sign the compressed cell data; and
- transmit the encrypted and digitally signed cell data over the network data to a remote vehicle having a vehicle-borne map data processing terminal;
- characterised in that the set of instructions further configures the terminal to reduce the respective bit length of a plurality of vector data values.

19. A set of instructions according to claim 18, wherein the set of instructions further configures the terminal to entropy encode the bit-reduced vector data values and feature data values.

* * * * *